United States Patent
Dabak et al.

(10) Patent No.: US 11,438,197 B2
(45) Date of Patent: Sep. 6, 2022

(54) ADAPTIVE EQUALIZER WITH A REAL FEEDFORWARD FILTER AND A SINGLE COMPLEX FEEDFORWARD TAP

(71) Applicant: Texas Instruments Incorporated, Dallas, TX (US)

(72) Inventors: Anand Dabak, Plano, TX (US); Mahmoud Abdelmoneim Abdelmoneim Elgenedy, Worcester, MA (US); Timothy Mark Schmidl, Dallas, TX (US); Swaminathan Sankaran, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/096,045

(22) Filed: Nov. 12, 2020

(65) Prior Publication Data
US 2022/0150093 A1    May 12, 2022

(51) Int. Cl.
*H04L 25/03* (2006.01)
*H04B 3/32* (2006.01)

(52) U.S. Cl.
CPC ......... *H04L 25/03057* (2013.01); *H04B 3/32* (2013.01)

(58) Field of Classification Search
CPC .............................. H04L 25/03057; H04B 3/32
See application file for complete search history.

(56) References Cited

U.S. PATENT DOCUMENTS

| | | | | |
|---|---|---|---|---|
| 5,642,382 A | * | 6/1997 | Juan | H03H 17/0292 348/725 |
| 5,835,532 A | * | 11/1998 | Strolle | H04N 5/455 375/321 |
| 6,421,378 B1 | * | 7/2002 | Fukuoka | H04B 7/005 375/229 |
| 6,907,065 B2 | | 6/2005 | Kim | |
| 7,269,216 B2 | * | 9/2007 | Kennedy | H04L 25/0305 375/233 |
| 2002/0141437 A1 | * | 10/2002 | Meyer | H04B 7/0845 370/442 |
| 2005/0123075 A1 | * | 6/2005 | Kim | H04L 25/025 375/340 |

OTHER PUBLICATIONS

"Adaptive Equalizers", Mathworks Release Notes R2019b, copyright 1994-2019, available at https://www.mathworks.com/help/comm/ug/adaptive-equalizers.html on Dec. 7, 2019, pp. 1-24.

* cited by examiner

*Primary Examiner* — Sophia Vlahos
(74) *Attorney, Agent, or Firm* — Valerie M. Davis; Charles A. Brill; Frank D. Cimino

(57) ABSTRACT

In described examples of a signal equalizer, a complex signal having a first signal component and a second signal component is received from a communication channel. Adaptive equalization of crosstalk between the first signal component and the second signal component is performed using a single complex tap of a feedforward equalizer. A feedforward filter with real only taps converts the channel into a minimum phase channel that has postcursor interference only so that a low complexity decision feedback filter with all complex taps can easily eliminate the postcursor interreference.

20 Claims, 12 Drawing Sheets

ADAPTIVE EQUALIZER WITH A REAL FEEDFORWARD FILTER AND A SINGLE COMPLEX FEEDFORWARD TAP

TECHNICAL FIELD

This relates to an adaptive equalizer.

BACKGROUND

Based on the concept of real numbers, a complex number is a number of the form a+bi, where a and b are real numbers and i is an indeterminate satisfying $i^2=-1$. The real number a is called the real part of the complex number a+bi; the real number b is called its imaginary part.

For the dielectric waveguide cable in the millimeter-wave frequency band (110-140 GHz), the channel group delay is generally asymmetric parabolic. Therefore, the channel impulse response is a complex multipath response in which there is a multipath cross talk between the transmitted in-phase and quadrature phase components. For passband transmission, two independent signals can be transmitted by modulating the amplitude and phase of sinusoidal signal. Equivalently, the two independent signals can be transmitted by modulating the amplitude of two sinusoidal signals phase shifted by 90 degrees. An equivalent system is modeled as a complex baseband (In-phase and Quadrature-phase) transmitted/received signals. A QAM (Quadrature Amplitude Modulation) or a QPSK (Quadrature Phase Shift Keying) transmission method may be used, for example. When a passband signal (or equivalently a complex baseband signal) is transmitted over a complex channel (a multipath where each path has a different phase, like DWG channel), the two transmitted independent components, amplitude and phase of passband signal (equivalently, In-phase and Quadrature phase of the complex baseband signal) will interfere to each other. On other words, in addition to a multipath channel effect on each component, they will also suffer from crosstalk from each other.

A dielectric waveguide (DWG) is a high frequency alternative to copper wires and optical cables. A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the dielectric constant ($\varepsilon k$). The term insulator is generally used to indicate electrical obstruction while the term dielectric is used to indicate the energy storing capacity of the material by means of polarization.

Typically, an adaptive complex equalizer with all complex taps for in-phase and quadrature phase components may be used to reverse distortion incurred by a signal as it traverses a channel, such as through a DWG. The equalizer can be either a linear complex equalizer which has a feedforward (FF) filter only, or decision feedback (DFE) complex equalizer which has feedforward and feedback (FB) parts.

SUMMARY

In described examples of a signal equalizer, a complex signal having a first signal component and a second signal component is received from a communication channel. Adaptive equalization of crosstalk between the first signal component and the second signal component is performed using a single complex tap of a feedforward equalizer. A feedforward filter with real only taps converts the channel into a minimum phase channel that has postcursor interference only so that a low complexity decision feedback filter with all complex taps can easily eliminate the postcursor interreference.

DETAILED DESCRIPTION

Figure 1A:
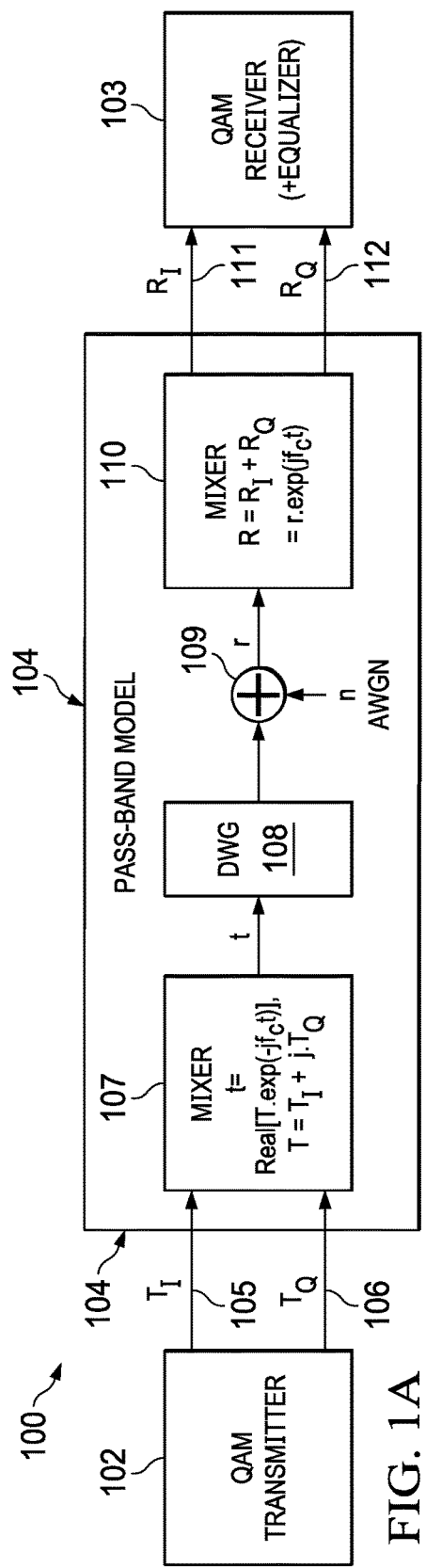
FIGS. 1A, 1B are a block diagrams illustrating a system with a complex communication channel.

In the drawings, like elements are denoted by like reference numerals for consistency.

For a dielectric waveguide (DWG) cable in the millimeter-wave frequency band, (110-140 GHz), the channel group delay is generally asymmetric parabolic. Because of this, the channel impulse response is a complex multipath response which produces multipath cross talk between the transmitted in-phase and quadrature phase components of the channel. Usually, a single stage adaptive complex equalizer with complex taps for in-phase and quadrature phase components may be used to reverse distortion incurred by a signal as it traverses a channel, such as through a DWG. However, an equalizer for operation in the millimeter-wave frequency band with complex taps is difficult to implement and fabricated in a single integrated circuit.

Adaptive equalizer structures provide suboptimal equalization of time variations in the propagation channel characteristics. However, these equalizers are appealing because their computational complexity is lower than maximum-likelihood sequence estimation (MLSE) equalizers. Adaptive equalizer structure options include linear and decision-feedback. Adaptive algorithm options include least mean square (LMS), recursive least square (RLS), and constant modulus algorithm (CMA). The general operation of adaptive equalizers is described in the literature, for example, see "Adaptive Equalizers," Mathworks Release Notes R2019b, 2019.

To decode a received signal, an adaptive equalizer first applies a finite impulse response (FIR) feedforward filter to the symbols in the input signal. The FIR filter tap weights correspond to a channel estimate. The adaptive filter then outputs the signal estimate and uses the signal estimate to update the tap weights for the next symbol using decision logic to generate the error signal. The signal estimate and updating of weights depends on the adaptive equalizer structure and algorithm.

In herein described examples, a simplified feedforward filter replaces a complex feedforward filter. Equalizer complexity is reduced by using only real feedforward filter taps instead of complex feedforward filter taps. A single complex tap is provided for phase rotation correction. Moreover, the complex tap in the feedforward equalizer path can help mitigating the IQ imbalance. Furthermore, the real feedforward filter will help converting the channel into a minimum phase channel (has postcursor interference only) so that a low complexity decision feedback filter with all complex taps can easily eliminate the postcursor interreference.

The feedback filter complexity is usually small; therefore, in an example a feedback filter with all complex taps is used. In another example, a simplified feedback filter may be used that uses fewer complex taps. The simplified filter structures described herein provide lower complexity and more flexibility than a typical complex equalizer.

In described examples, a low complexity analog implementation is provided by reducing the loading on critical signals and simplifying the delay match between real and imaginary paths.

In some examples, a first stage is configured to be a pure real stage and a complex tap is implemented as a second stage. This enables a standard serializer/deserializer (SERDES) module to be used for the first stage. In described examples, the complex tap may be implemented as a pre-equalization or post-equalization tap. To efficiently mitigate cross talk from both post and pre-equalization tap configurations, the feedforward filter decision tap is moved toward the last tap so that all channel taps become postcursor and the feedback filter can therefore better help in eliminating crosstalk.

As described in more detail herein below, flexible structures are described which have different complexity/performance tradeoffs.

FIG. 1A is a block diagram illustrating an example system 100 that includes QAM transmitter 102, QAM receiver 103, and a complex a communication channel 104 coupled between an output of QAM transmitter 102 and an input of QAM receiver 103. In this example, QAM transmitter 102 produces a complex signal that includes an in-phase signal component 105 and a quadrature-phase signal component 106. Receiver 103 receives in-phase complex signal component 111 and quadrature-phase complex signal component 112, equalizes the complex signal, and then demodulates the complex signal using known or later developed demodulation techniques. The demodulated signal is then output for further processing by an associated system (not shown) using known or later developed communication and/or signal processing techniques.

DWG 108 has a multipath channel effect. Therefore, if information is modulated in magnitude and phase of a transmitted passband sinusoidal signal, DWG 104 will affect both magnitude and phase. Equivalently, in a base-band equivalent model, in-phase and quadrature-phase components of an information signal will be impacted due to the effective multi-path channel. QAM receiver 103 includes an equalizer described in more detail hereinbelow to mitigate the effects of the multipath channel effects in order to improve signal to noise ratio (SNR).

Complex communication channel 104 is illustrated in FIG. 1A as a pass-band model. In this example, mixer 107 represents the up-conversion for the transmitted signal from a complex base-band to real passband signal. Adder 109 represents the effect of ambient noise that gets added to the complex signal during transmission through DWG 104. Mixer 110 represents further down-conversion for the received real passband signal to equivalent complex base-band signal. In this example, the noise is assumed to be additive white Gaussian noise (AWGN).

Figure 1B:
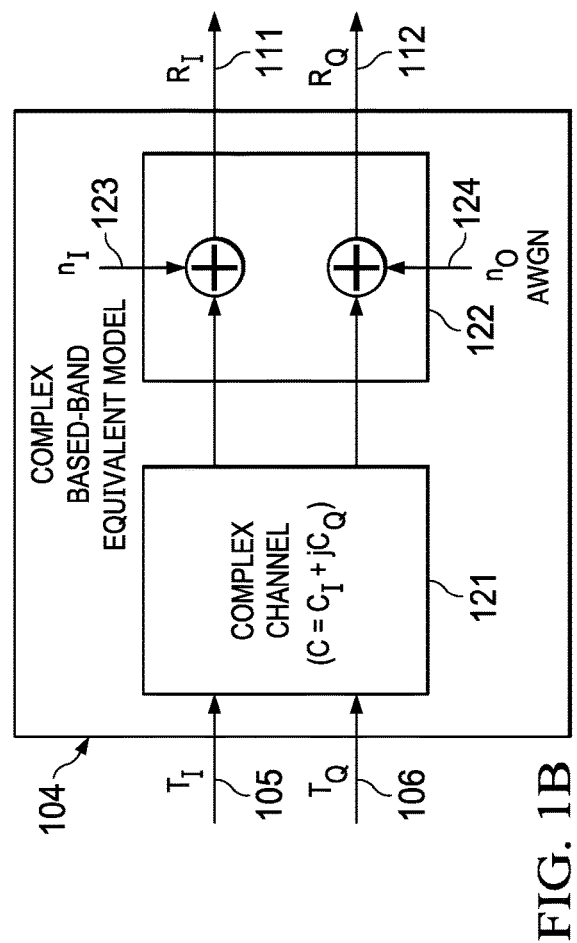

FIG. 1B is a block diagram illustrating complex communication channel 104 as a complex based-band equivalent model. In this example, transmission media 121 transports a complex signal that includes in-phase signal component 105 and quadrature-phase component 106. Complex AWGN having an in-phase component 123 and a quadrature-phase component is injected into the complex signal via adders 122.

Figure 2A:
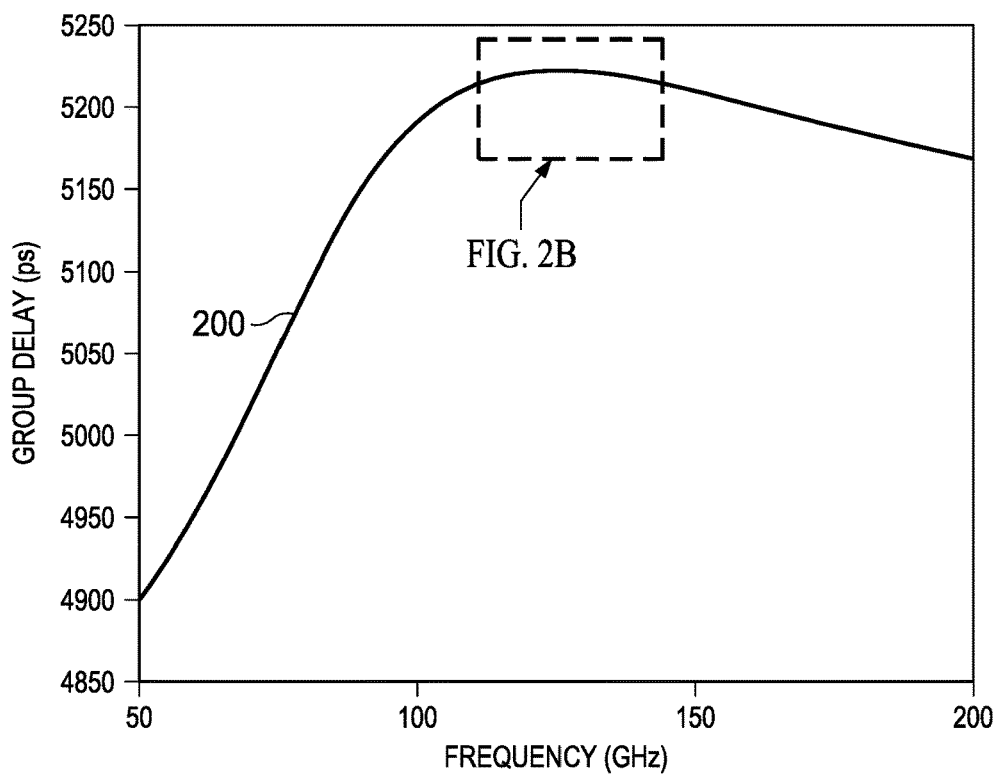
FIGS. 2A and 2B are plots of group delay of a signal propagating through a DWG.
Figure 2B:
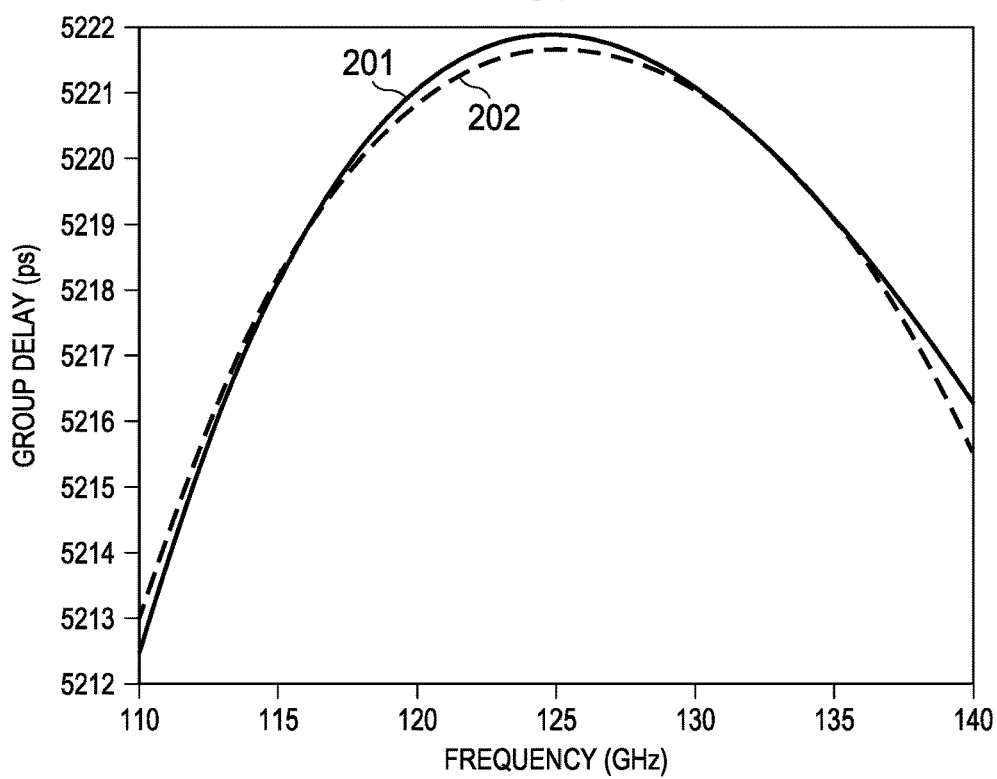

FIGS. 2A, and 2B are plots of group delay of a signal propagating through an example DWG. FIG. 2A illustrates a plot 200 group delay (ps) vs frequency (GHz) over a range of 50-200 GHz. FIG. 2B illustrates an expanded view of the plot over a range of 110-140 GHz for two different simulation models represented by plot 201 and 202. Initial measurements show that the DWG channel in the frequency band 110-140 GHz has an asymmetric parabolic group delay, which results in a multipath interference as well as a multipath crosstalk between in-phase and quadrature-phase transmitted data. In particular, with a passband from 110 to 140 GHz, the group delay variation from the lower edge of the band (110 GHz) to the center of the band (125 GHz) is about 9 ps/m, and the variation from the center to the upper edge of the band (140 GHz) is about 6 ps/m. In addition, if the group delay is not centered around the center frequency (125 GHz), the equivalent group delay becomes more asymmetric.

Figure 3:
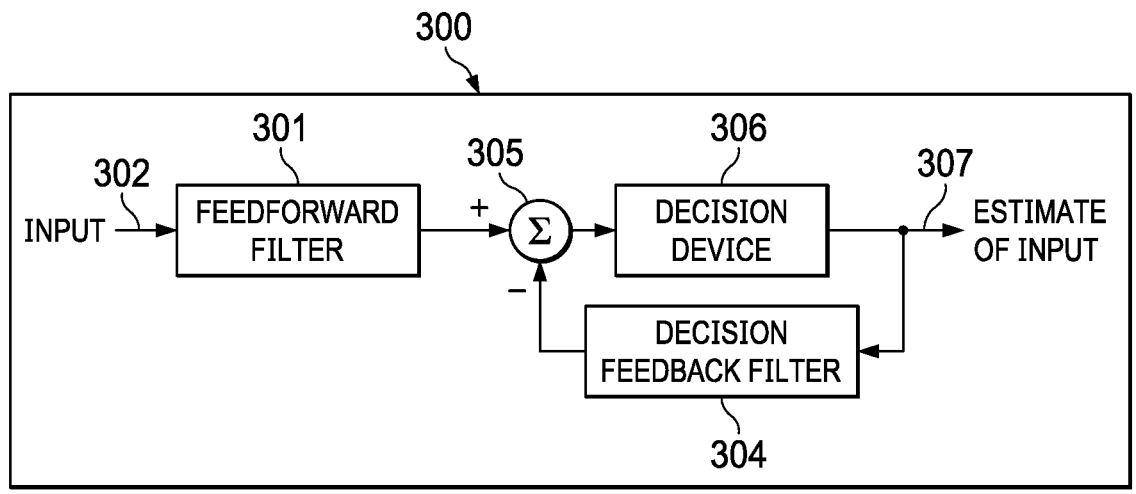
FIGS. 3-4 are block diagrams illustrating an example adaptive equalizer for a complex channel.

FIG. 3 is a block diagram illustrating an example SERDES equalizer 300 for a complex channel that operates at a frequency of 100 GHz, or more. Equalizer 300 includes a feedforward filter 301, a complex feedback filter 304, and a decision module 306 that produces an output signal 307 that is an equalized estimate of the input signal received on input 302 after subtracting the output of the feedback filter from the output of the feedforward filter using summer 305. In this example, the input signal received on input 302 is a QPSK signal. Other examples may be designed in a similar manner for other quadrature type complex signals. As will be descried in more detail hereinbelow, feedforward equalizer 301 is a feedforward filter that has multiple real taps but only a single complex tap. In various examples, decision feedback filter 304 has one or more complex taps.

Figure 4:
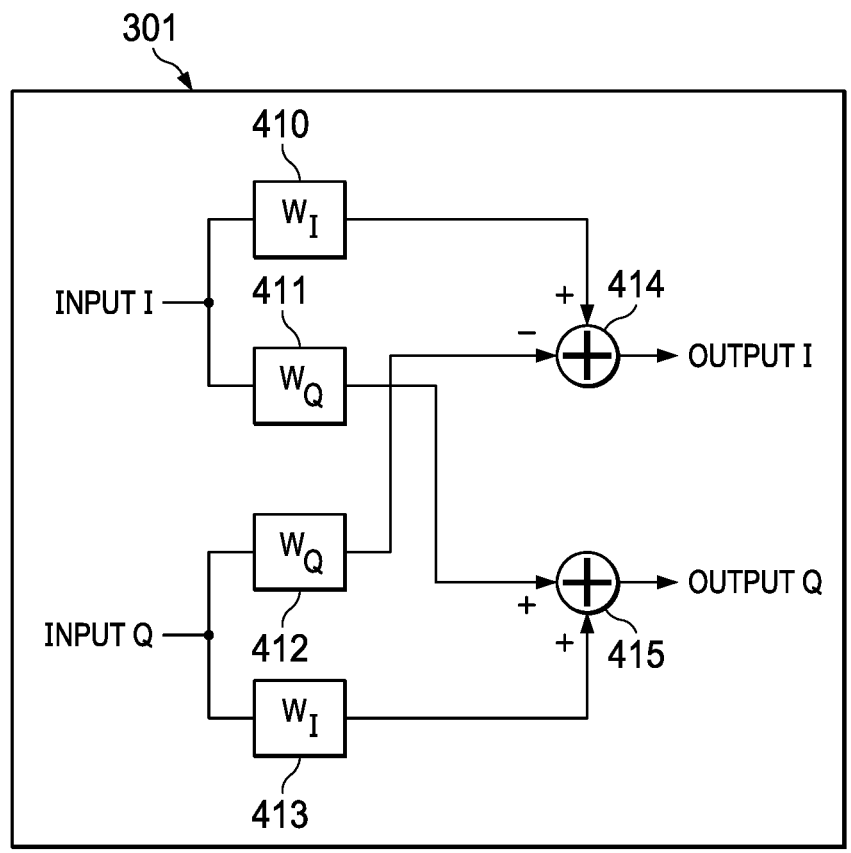

FIG. 4 is a function block diagram illustrating operation of feedforward filter 301. A filter module $w_I$ 410 for an in-phase portion of the channel and a filter module $w_Q$ 411 for quadrature-phase portion of the channel is connected to an input for the in-phase signal. Similarly, a filter module $w_Q$ 412 for a quadrature-phase portion of the channel and a filter module $w_I$ 413 for an in-phase portion of the channel is connected to an input for the quadrature-phase signal. Adder 414 combines the output of the in-phase filter 410 and the quadrature phase filter 411 to form an output for the in-phase transmitted component, while adder 414 combines the output of the in-phase filter 413 and the quadrature phase filter 412 to form an output for the quadrature-phase transmitted component.

Figure 5:
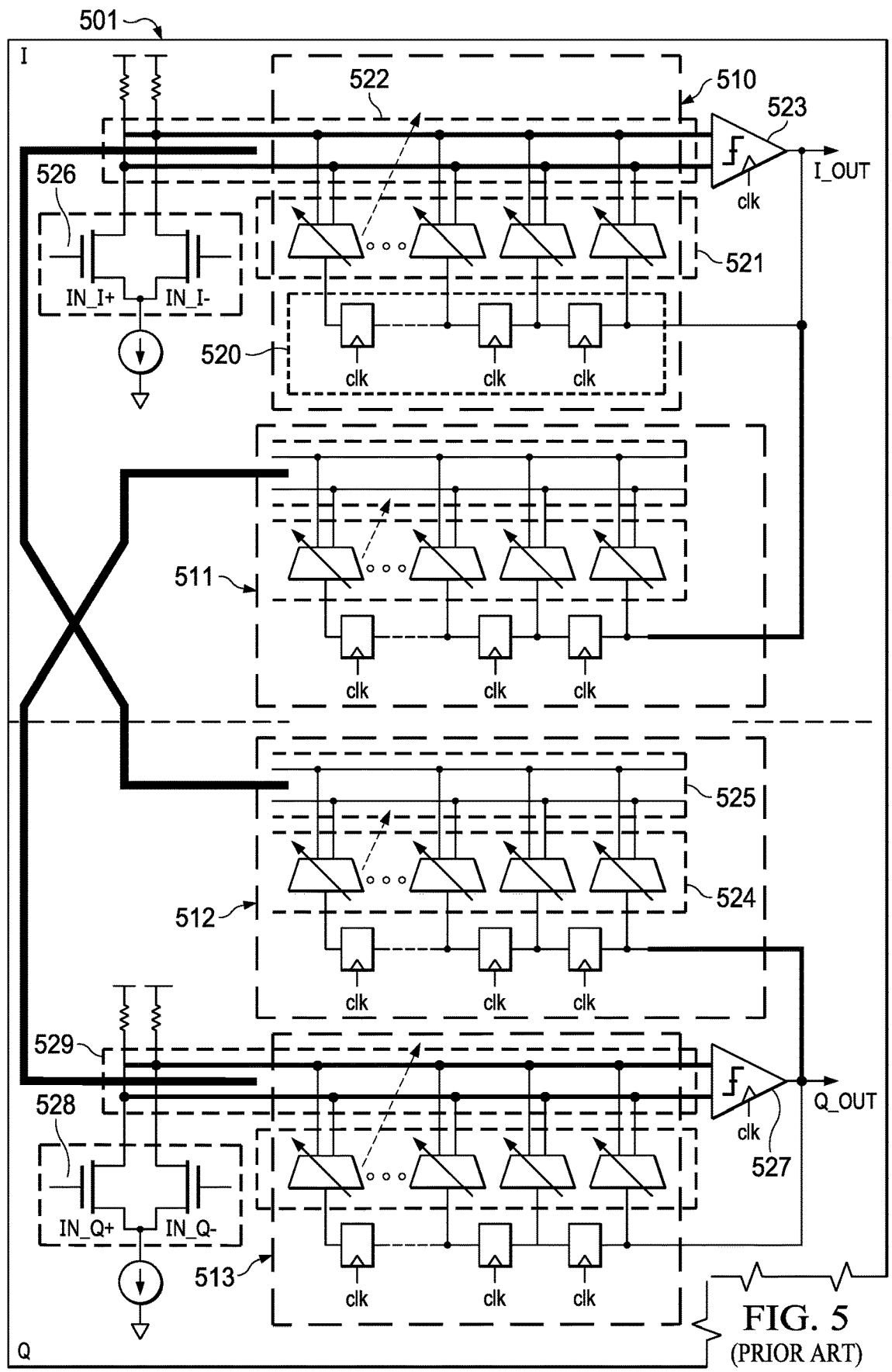
FIG. 5 illustrate a typical feed-forward filter for a complex channel.

FIG. 5 is a schematic illustrating the single-stage feedforward filter 501. In-phase filter 510 includes a digital delay line 520 that delays in-phase output signal I_OUT provided by comparator 523 for one clock cycle at each tap. Multiplying unit 521 multiplies each tap coefficient value by the data provided by the delay line 520. The output of each stage of multiplying unit 521 is combined on differential adder bus 522 which is in-turn coupled to an input of comparator 523. Differential input receiver 526 is coupled to differential summer bus 522.

Quadrature-phase filter 512 operates in a similar manner with the outputs of multiplying unit 525 combined on differential adder bus 525. Adder bus 525 is coupled to adder bus 522 to thereby add the output of in-phase filter 510 with the output of quadrature phase filter 512.

In a similar manner, comparator 527 forms quadrature-phase output signal Q_OUT based on the state of differential adder bus 529 that is coupled to the output of quadrature-phase filter 511, in-phase filter 513, and differential input receiver 528.

A problem with this approach is due to the loading produced on differential input receivers 526, 528 and the respective multiplying units within filters 510-514. Reliable operation at a target data rate of 100 Gbps using the 110-140 GHz band is not feasible with the configuration of feedforward filter 501 with present-day semiconductor fabrication technology.

Figure 6:
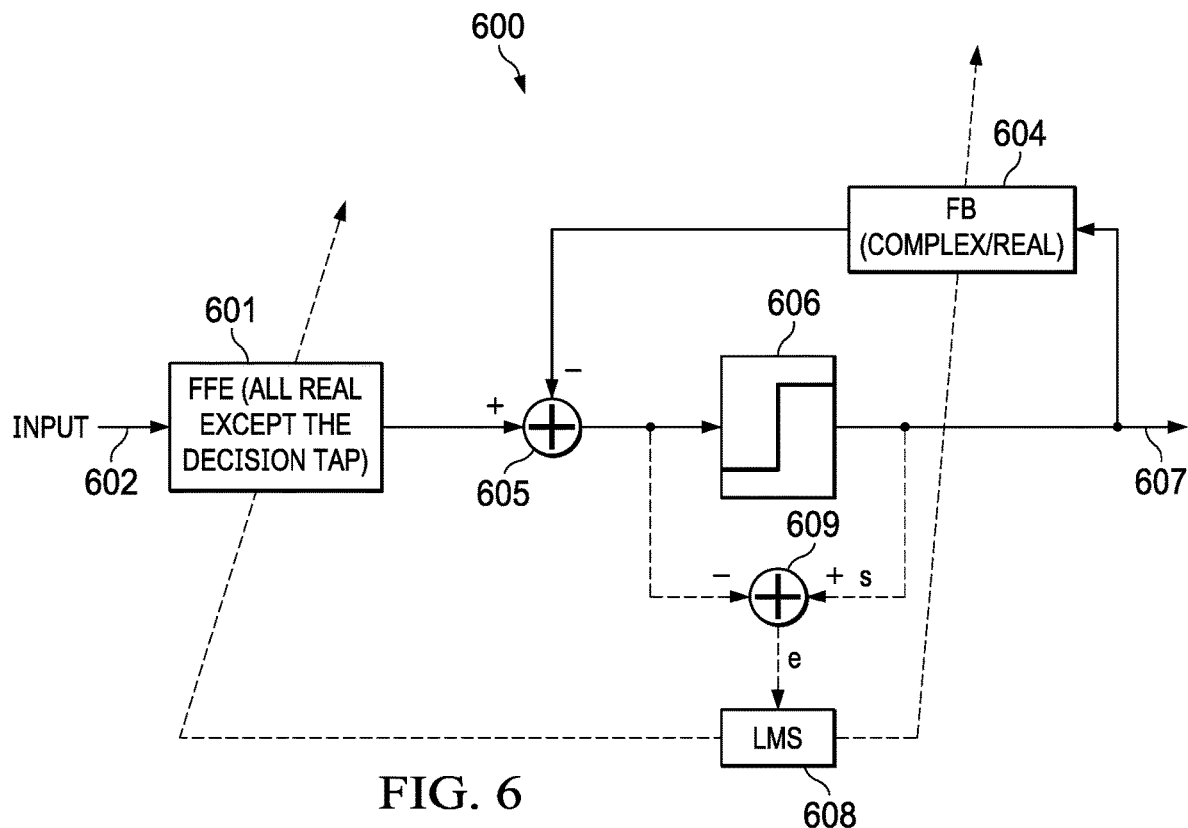
FIGS. 6-8 are block diagrams of example simplified equalizers for a complex channel.

FIG. 6 is a block diagram of an example simplified adaptive equalizer 600 that is similar to simplified equalizer 300 (FIG. 3) for a complex channel. As described hereinabove, an analog implementation to support a target data rate of 100 Gbps using a single-stage complex filtering as illustrated by filter 501 of FIG. 5 is a too complicated for current semiconductor fabrication capabilities to produce an integrated circuit at an acceptable commercial price. Similarly, a digital implementation using digital signal processing techniques is not feasible at 100 Gbps.

One option might be to dispense with complex filtering and only perform real filtering while ignoring the complex crosstalk effects. However, simulation has shown that using a simple all real filtering equalizer is insufficient to achieve a low bit error rate in a target DWG environment because of the high crosstalk. For example, a target bit error rate for an example system may be less than 1e-12.

Equalizer 600 includes a feedforward filter 601, which is also referred to herein as a feedforward equalizer (FFE) 601, a complex feedback filter 604, and a decision module 606 that produces a signal on output port 607 that is an equalized estimate of the input signal received on input port 602 after subtracting the output of the feedback filter from the output of the FFE using summer 605. To mitigate the complex channel in examples described herein, only a single complex tap is implemented in the FFE section 601. All of the other taps in the FFE 601 are implemented as real-only taps.

In various examples, an LMS (least mean squared) adaptation scheme for the simplified structure may be implemented to accommodate a single complex tap with multiple real taps, as will be described in more detail herein below. LMS adaption logic 608 is responsive to an error signal produced by second summing node 609.

The feedback filter 604 for example equalizer 600 is less complicated than the FFE 601 because the number of taps of the feedback filter 604 as well as the number of input levels can be less than used for the FFE 601. Hence, an example feedback filter 604 is implemented as a complex single stage filter. In another example, the feedback filter may be implemented as a simplified filter with fewer complex taps in a similar manner as the feedforward filter.

Figure 7:
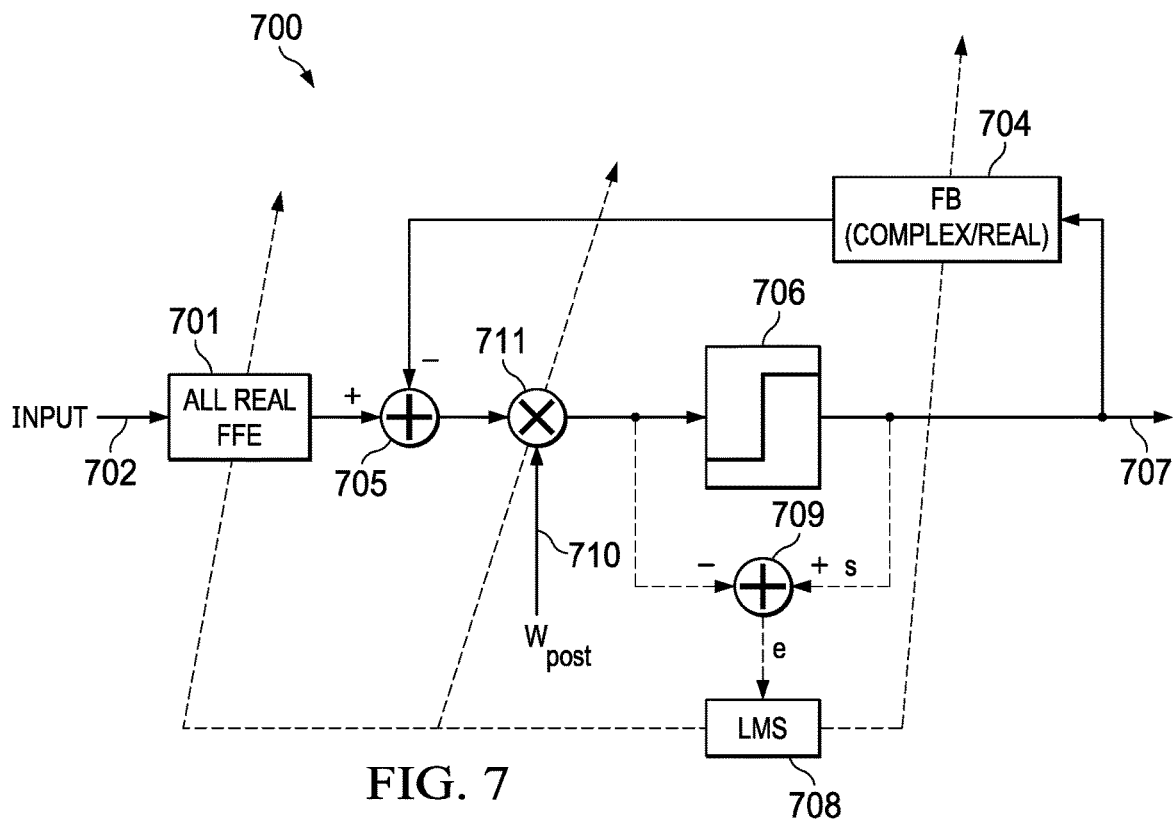

FIG. 7 is a block diagram of an example simplified adaptive equalizer 700 that is similar to simplified equalizer 600 (FIG. 6) for a complex channel. Equalizer 700 includes a FFE 701, a complex feedback filter 704, and a decision module 706 that produces a signal on output port 707 that is an equalized estimate of the input signal received on input port 702 after subtracting the output of the feedback filter from the output of the FFE using summer 705. To mitigate the complex channel in examples described herein, only a single complex tap is implemented in the FFE section. However, in this example, FFE 701 contains only real taps and a single complex tap 710 is implemented separately from FFE 701. The output from complex tap 710 is combined with the output from summer 705 by a complex multiplier 711. Since the output of complex tap 710 is multiplied with the output of summer 705, complex tap 710 is referred to herein as a "post-equalization tap."

In various examples, an LMS adaptation scheme for the simplified structure may be implemented to accommodate a single complex tap with multiple real taps, as will be described in more detail herein below. LMS adaption logic 708 is responsive to an error signal produced by second summing node 709.

The feedback filter 704 for example equalizer 700 is less complicated than the FFE 701 because the number of taps of the feedback filter 704 as well as the number of input levels can be less than used for the FFE 701. Hence, an example feedback filter 704 is implemented as a complex single stage filter. In another example, the feedback filter may be implemented as a simplified filter with fewer complex taps in a similar manner as the FFE.

Figure 8:
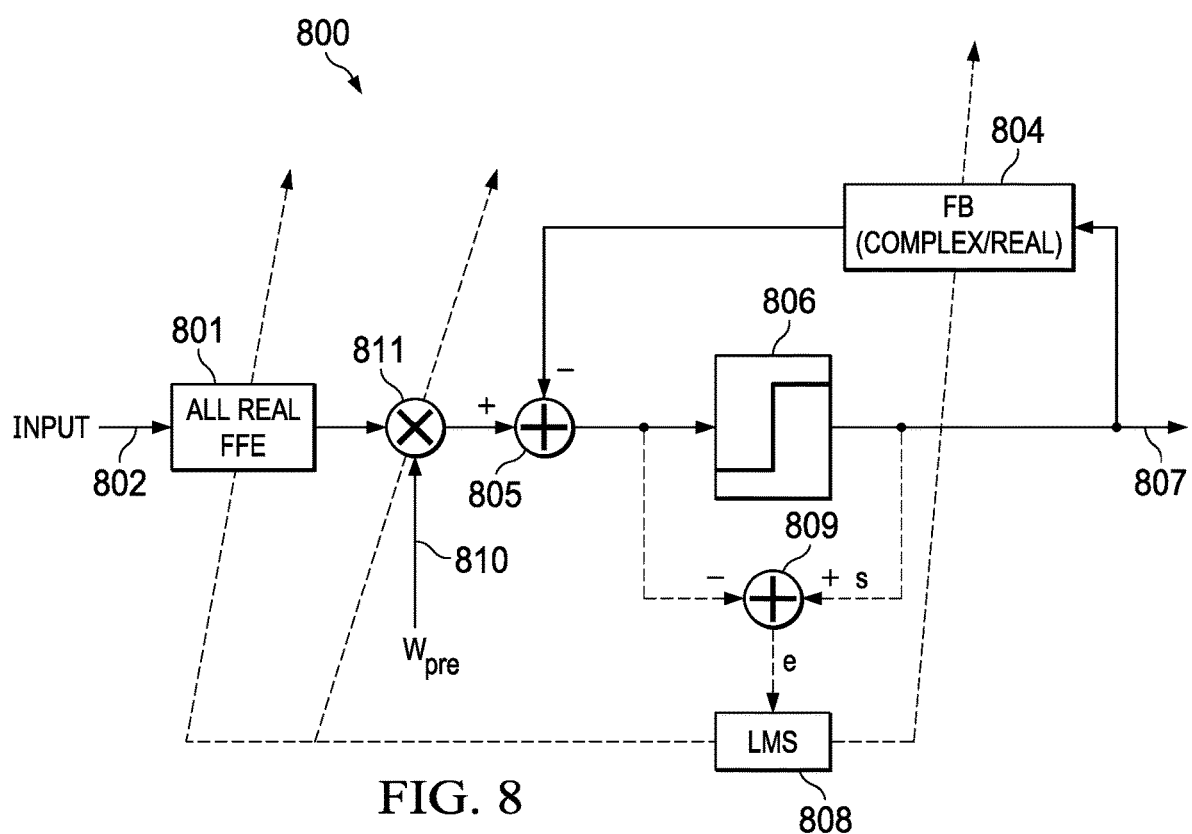

FIG. 8 is a block diagram of an example simplified adaptive equalizer 800 that is similar to simplified equalizer 700 (FIG. 7) for a complex channel. Equalizer 800 includes a FFE 801, a complex feedback filter 804, and a decision module 806 that produces a signal on output port 807 that is an equalized estimate of the input signal received on input port 802 after subtracting the output of the feedback filter from the output of the FFE using summer 805. To mitigate the complex channel in examples described herein, only a single complex tap is implemented in the FFE section. However, in this example, FFE 801 contains only real taps and a single complex tap 810 is implemented separately from FFE 801. The output from complex tap 810 is combined with the output from FFE 801 by a complex multiplier 811. An output from multiplier 811 is then provided to summer 805. Since the output of complex tap 810 is multiplied with the output of FFE 801 before being provided to summer 805, complex tap 810 is referred to herein as a "pre-equalization tap."

In various examples, an LMS adaptation scheme for the simplified structure may be implemented to accommodate a single complex tap with multiple real taps, as will be described in more detail herein below. LMS adaption logic 808 is responsive to an error signal produced by second summing node 809.

The feedback filter 804 for example equalizer 800 is less complicated than the FFE 801 because the number of taps of the feedback filter 804 as well as the number of input levels can be less than used for the FFE 801. Hence, an example feedback filter 804 is implemented as a complex single stage filter. In another example, the feedback filter may be implemented as a simplified filter with fewer complex taps in a similar manner as the FFE.

Equalizer 600 (FIG. 6) is less complex than equalizer 700 (FIG. 7) or equalizer 800 (FIG. 8). However, equalizer 700 and equalizer 800 may use a simple real only SERDES module to implement FFE 701 (FIG. 7) or FFE 801 (FIG. 801) and thereby simply the design process.

Figure 9:
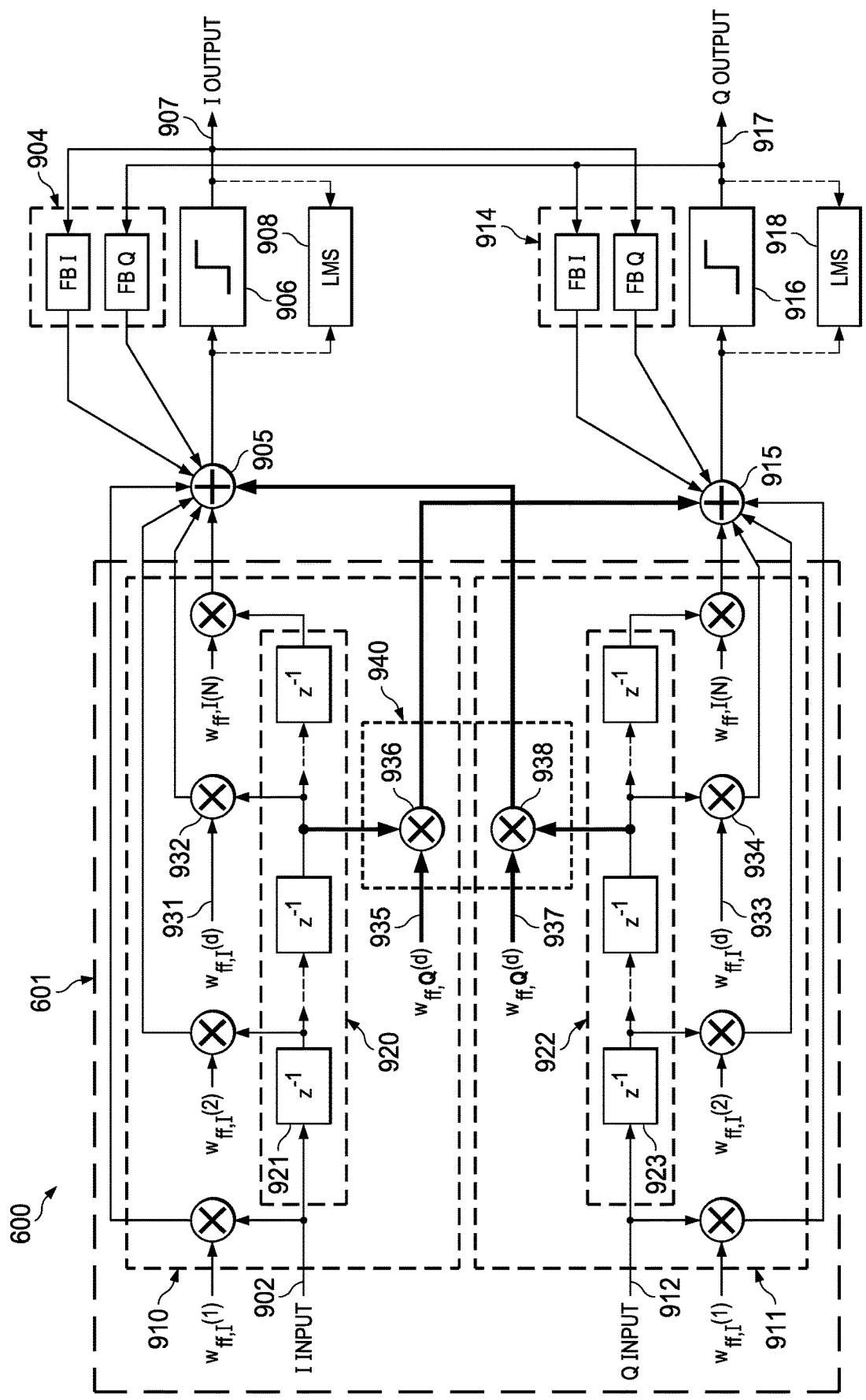
FIGS. 9-11 are more detailed block diagrams of example simplified equalizers for a complex channel.

FIG. 9 is a more detailed block diagram of example simplified adaptive equalizer 600 as shown in FIG. 6 in which the in-phase and quadrature phase sections are illustrated. FFE 601 includes an in-phase portion 910 with I input 902 and a quadrature-phase portion 911 with Q input 912. Complex feedback filter 604 (FIG. 6) includes complex feedback filter portion 904 for the in-phase portion 910 and complex feedback filter 914 for the quadrature phase portion 911. There is a decision module 906 and LMS adaption logic 908 for the in-phase portion and a decision module 916 and LMS adaption logic 918 for the quadrature-phase portion.

FFE in-phase portion 910 includes a delay line 920 that has a number N of delay elements, such as delay element 921. Delay line 920 is coupled to receive an in-phase signal from I input 902. For each node of delay line 920 that is configured as a tap, a multiplier, such as multiplier 932, is configured with one input coupled to the respective delay line node and a second input configured to receive a respective tap coefficient, such as tap coefficient input 931. In this manner, the signal at each node of delay line 920 is multiplied by a tap coefficient that is adaptively adjusted by the LMS 908 adaptive equalization module.

Similarly, FFE quadrature-phase portion 911 includes a delay line 922 that has a number N of delay elements, such as delay element 923. Delay line 922 is coupled to receive a quadrature-phase signal from Q input 912. For each node of delay line 922 that is configured as a tap, a multiplier, such as multiplier 934, is configured with one input coupled to the respective delay line node and a second input configured to receive a respective tap coefficient, such as tap coefficient input 933. In this manner, the signal at each node of delay line 922 is multiplied by a tap coefficient that is adaptively adjusted by the LMS 918 adaptive equalization module.

In this example, only one tap is configured as a complex tap, while all of the rest of the taps are simple real-only taps. Tap (d) 940 is referred to as the "decision tap" and is configured as a complex tap. Complex tap 940 includes an additional pair of multipliers 936, 938 that are configured to multiply an additional set of tap coefficients 935, 937 respectively with the respective node signals of delay lines 920, 922. The output from multiplier 936 is provided to summer 915 in the quadrature phase section while the output from multiplier 938 is provided to summer 905 in the in-phase section. In this manner, cross talk between the in-phase signal received on I input 902 and the quadrature-phase signal received on Q input 912 minimized.

In this example, each tap coefficient and multiplier are implemented as nine bits. Each tap coefficient is a real number that may be positive or negative. In other examples, the tap coefficients may be larger for more accuracy or smaller to reduce design complexity as long as performance goals are reached. Simulations have shown that tap coefficients in the range of at least 5-9 bits provide good performance. The target operating frequency and semiconductor process parameters affect performance and tap coefficient bit count. As described above, described examples are intended for use in the 100-130 GHz range.

Figure 10:
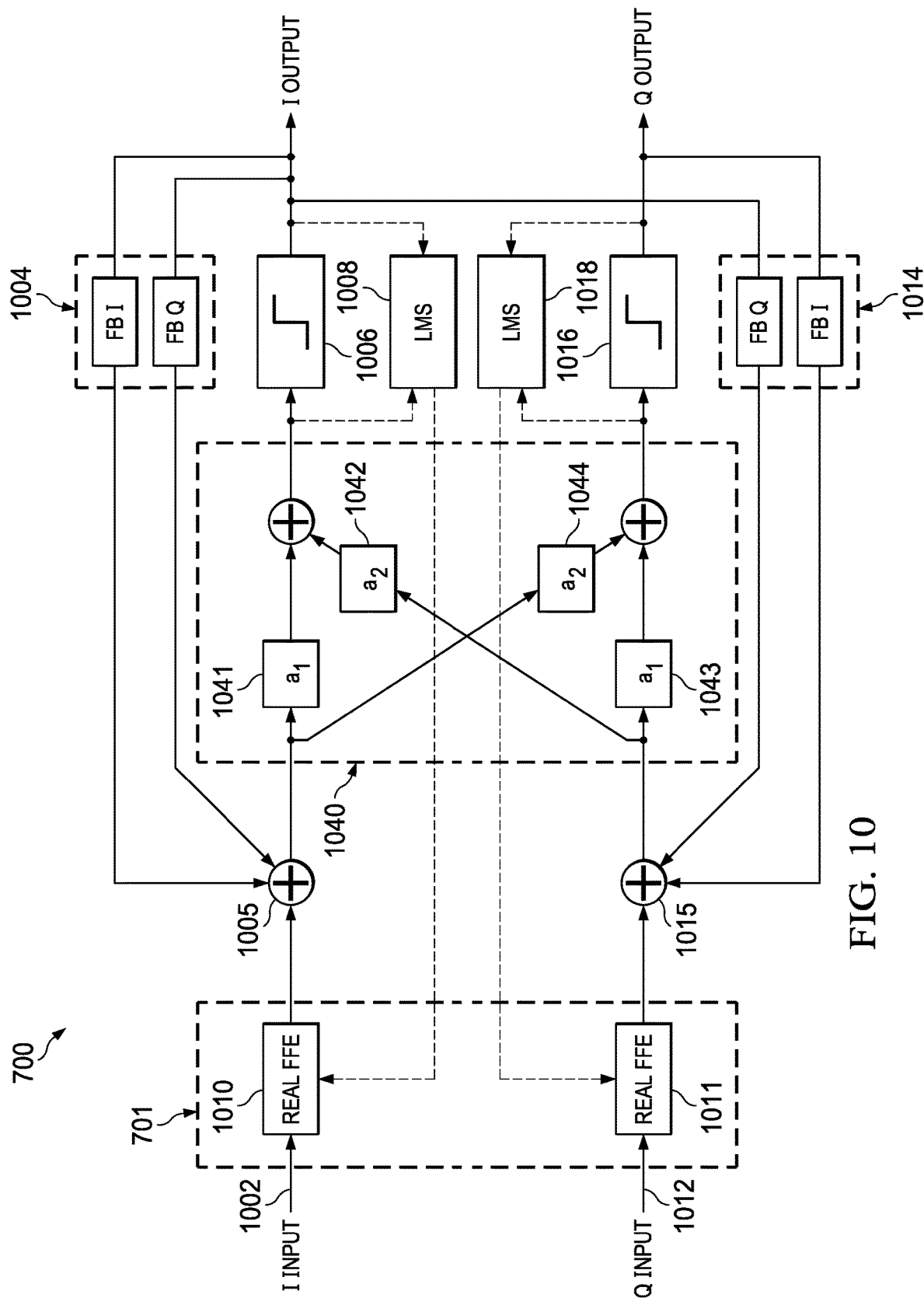

FIG. 10 is a more detailed block diagram of example simplified adaptive equalizer 700 as shown in FIG. 7 in which the in-phase and quadrature phase sections are illustrated. Feedforward equalizer (FFE) 701 includes an in-phase portion 1010 with I input 1002 and a quadrature-phase portion 1011 with Q input 1012. Complex feedback filter 704 (FIG. 7) includes complex feedback filter portion 1004 for the in-phase portion 1010 and complex feedback filter 1014 for the quadrature-phase portion 1011. There is a decision module 1006 and LMS adaptive logic 1008 for the in-phase portion and a decision module 1016 and LMS adaptive logic 1018 for the quadrature-phase portion.

FFE portions 1010, 1011 are similar to FFE portions 910, 911 (FIG. 9) except that FFE portions 1010, 1011 do not include a complex tap. Each FFE portion 1010, 1011 includes a delay line that has a number of delay elements. A multiplier is configured with one input coupled to a respective delay line node and a second input configured to receive a respective tap coefficient. In this manner, the signal at each node of delay line within filter portion 1010, 1011 is multiplied by a tap coefficient that is controlled by the respective LMS 1008, 1018 adaptive equalization logic module.

In this example, a single stand-alone post-equalization tap 1040 is configured as a complex tap. Complex tap 1040 includes in-line coefficient multiplier blocks 1041, 1043 and cross-coupled coefficient multipliers blocks 1042, 1044 that are configured to multiply an additional set of tap coefficients with the equalized signals output from summers 1005, 1015 respectively. In this manner, cross talk between the in-phase signal received on I input 1002 and the quadrature-phase signal received on Q input 1012 minimized.

Figure 11:
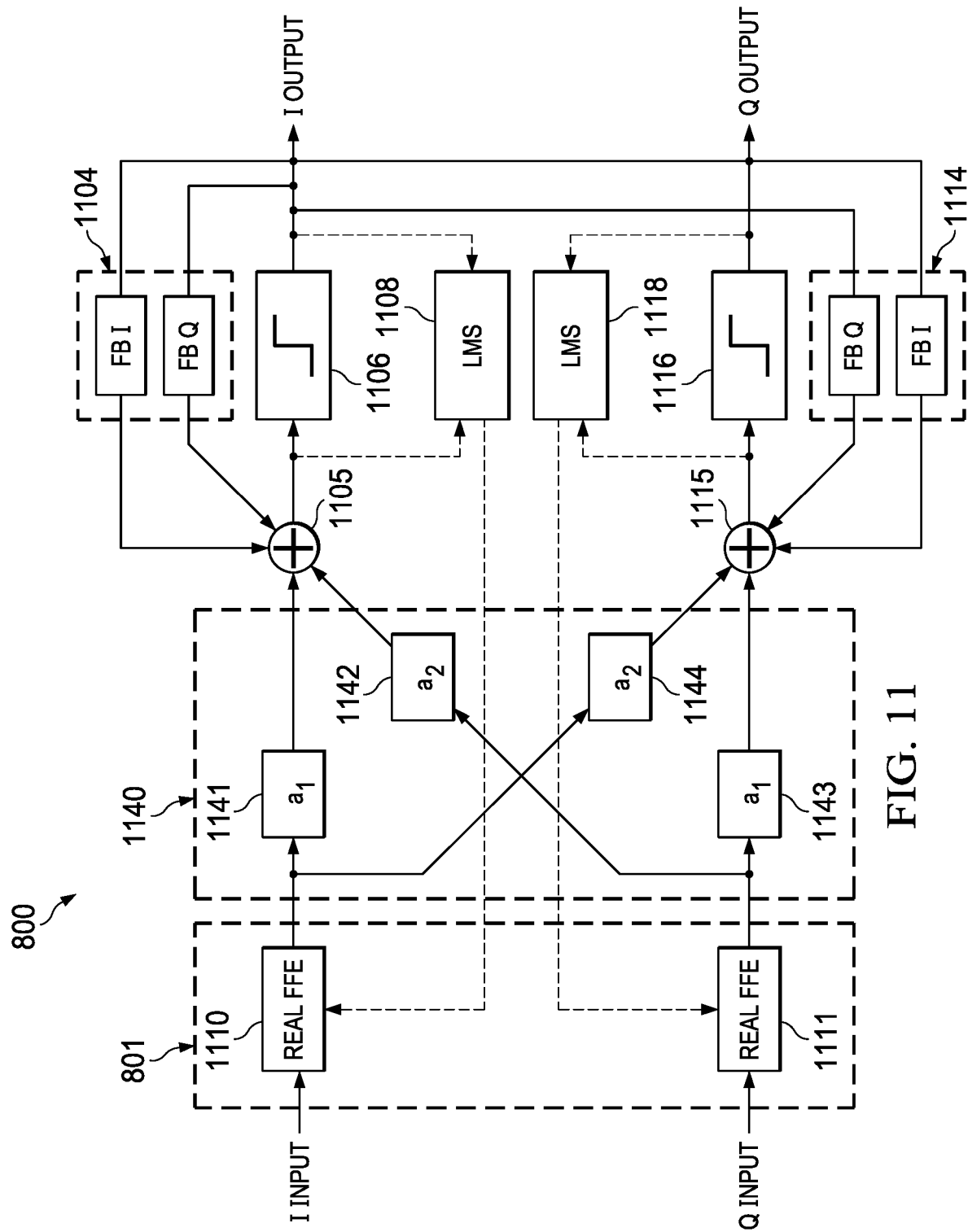

FIG. 11 is a more detailed block diagram of example simplified adaptive equalizer 800 as shown in FIG. 8 in which the in-phase and quadrature phase sections are illustrated. Feedforward equalizer (FFE) 801 includes an in-phase portion 1110 with I input 1102 and a quadrature-phase portion 1111 with Q input 1112. Complex feedback filter 804 (FIG. 8) includes complex feedback filter portion 1104 for the in-phase portion 1110 and complex feedback filter 1114 for the quadrature-phase portion 1111. There is a decision module 1106 and LMS adaptive logic module 1108 for the in-phase portion and a decision module 1116 and LMS adaptive logic module 1118 for the quadrature-phase portion.

FFE portions 1110, 1111 are similar to FFE portions 1010, 1011 (FIG. 10). Each FFE portion 1110, 1111 includes a delay line that has a number of delay elements. A multiplier is configured with one input coupled to a respective delay line node and a second input configured to receive a respective tap coefficient. In this manner, the signal at each node of delay line within filter portion 1110, 1111 is multiplied by a tap coefficient that is controlled by the respective LMS 1108, 1118 adaptive equalization module.

In this example, a single stand-alone pre-equalization tap 1140 is configured as a complex tap. Complex tap 1140 includes in-line coefficient multiplier blocks 1141, 1143 and cross-coupled coefficient multipliers blocks 1142, 1144 that are configured to multiply an additional set of tap coefficients with the signals output from FFE portions 1110, 1111 respectively. In this manner, cross talk between the in-phase signal received on I input 1102 and the quadrature-phase signal received on Q input 1112 minimized.

Adaptation

The filter coefficients can be generated directly using a modified version of the formulas of the minimum mean squared error (MMSE) equalizer, or adaptively using a modified version for the LMS algorithm.

The LMS adaptation for the simplified adaptive equalizer structure is different and can be done in different ways. LMS adaptation is used to mimic a desired filter by finding the filter coefficients that relate to producing the least mean square of the error signal. For example, adaptation adjusts the respective filter coefficients for each tap, such as coefficients wff$_I$ (1:N) and w$_{ff,Q}$ (d) of FIG. 9.

LMS adaptation is performed in a similar manner for each of the described examples 600 (FIG. 6), 700 (FIG. 7), and 800 (FIG. 8); however, the location of the feedforward complex tap is different in each example and results in slightly different adaptation technique.

In adaptive equalizer 600 (FIGS. 6, 9), a single complex tap (d) 940 is implemented within feedforward equalizer (FFE) 601, as described in more detail above with reference to FIG. 9. Referring to FIG. 6, error signal e is produced by subtractor 609 according to expression (1). Signal "s" represents the decision directed symbol output by decision module 606. w$_{ff}$r is feedforward filter responsive to the received signal 602 and w$_{fb}$s is the feedback filter signal output from feedback filter 604 responsive to the decision directed symbol s signal. Table 1 defines the various symbols used in the following description.

TABLE 1 definition of terms

| | |
|---|---|
| w$_{ff}$ | Feedforward filter |
| w$_{fb}$ | Feedback filter |
| r(n) | Received signal vector |
| s(n) | Original symbols vector (or decision directed) |
| s(n) | Original current symbol (or decision directed) |
| e | the error signal |
| d | the decision tap |
| w$_{post}$ | the post equalizer complex tap |
| w$_{pre}$ | the pre-equalizer complex tap |
| μ | LMS adaptation step |

Expressions (2), (3), and (4) illustrate how error signal e is used by LMS logic 608 to determine new filter coefficients w$_{ff,new}$. Expressions (2) and (3) are mainly to adapt the real FFE coefficients where Real{ } operation is used to restrict the LMS algorithm to adapt real coefficients only. Moreover, expression (4) is for adapting the complex tap of decision (d) where general complex LMS adaptation is used with no restrictions. As in expression (5), the complex feedback filter 604 is adaptively equalized in a similar manner using a general complex LMS adaptation. If a real FB filter is used, Real{ } operation should be applied to the second term of Expression (5).

$$e = s - (w_{ff}r - w_{fb}s) \quad (1)$$

$$w_{ff,new}(1:d-1) = w_{ff,old}(1:d-1) + \text{Real}[\mu \text{ sgn}(r^*(1:d-1)) \text{sgn}(e)] \quad (2)$$

$$w_{ff,new}(d+1:\text{end}) = w_{ff,old}(d+1:\text{end}) + \text{Real}[\mu \text{ sgn}(r^*(d+1:\text{end})) \text{sgn}(e)] \quad (3)$$

$$w_{ff,new}(d) = w_{ff,old}(d) - \mu \text{ sgn}(r^*(d)) \text{sgn}(e) \quad (4)$$

$$w_{fb,new} = w_{fb,old} - \mu \text{ sgn}(S^*) \text{sgn}(e) \quad (5)$$

In adaptive equalizer 700 (FIGS. 7, 10), a single complex post-equalizer tap 1040 is implemented, as described in more detail above with reference to FIG. 10. Referring to FIG. 7, error signal e is produced by subtractor 709 according to expression (5). Signal "S" represents the decision directed symbol output by decision module 706. w$_{ff}$r is feedforward filter responsive to the received signal 702 and w$_{fb}$s is the feedback filter signal output from feedback filter 704 responsive to the decision directed symbol S signal. The signal output from summer 705 is further filtered by post equalizer tap 711 using filter vector w$_{post}$. Expressions (7) and (8) illustrate how error signal e is used by LMS logic 708 to determine new filter coefficients for both the real FFE and the w$_{post,new}$ for post-equalizer tap 711 in an adaptive manner. In this example, taps within FFE 701 and feedback filter 704 are adaptively equalized in a similar manner.

$$e = S - w_{post,new}(w_{ff}r - w_{fb}s) \quad (6)$$

$$w_{ff,new} = w_{ff,old} + \text{Real}[\mu \text{ sgn}(r^*) \text{sgn}(e)] \quad (7)$$

$$w_{post,new} = w_{post,old} - \mu \text{ sgn}(r^*(d)) \text{sgn}(e) \quad (8)$$

In adaptive equalizer 800 (FIGS. 8, 11), a single complex pre-equalizer tap 1140 is implemented, as described in more detail above with reference to FIG. 11. Referring to FIG. 8, error signal e is produced by subtractor 809 according to expression (8). Signal "I" represents the decision directed symbol output by decision module 806. w$_{ff}$r is feedforward filter responsive to the received signal 802 and w$_{fb}$s is the feedback filter signal output from feedback filter 804 responsive to the decision directed symbol S signal. The signal output from FFE 801 is further filtered by pre-equalizer tap 811 using filter vector w$_{pre}$. Expressions (10) and (11) illustrate how error signal e is used by LMS logic 808 to determine new filter coefficients for both the real FFE and the w$_{pre,new}$ for pre-equalizer tap 811 in an adaptive manner. In this example, taps within FFE 801 and feedback filter 804 are adaptively equalized in a similar manner.

$$e = s - (w_{pre,new}w_{ff}r - w_{fb}s) \quad (9)$$

$$w_{pre,new} = w_{pre,old} - \mu \text{ sgn}(r^*(d)) \text{sgn}(e) \quad (10)$$

$$w_{ff,new} = w_{ff,old} + \text{Real}[\mu \text{ sgn}(r^*) \text{sgn}(e)] \quad (11)$$

Table 2 summarizes simulated signal to interference ratio (SIR) of various equalizer configurations operating on a 100 GHz signal, including symmetric, Rosenberger, and parabolic 7/5 with a +5% frequency shift. The first column of results is for a single stage equalizer in which the feedforward filter includes only real taps. The second column is for simplified equalizer in which the feed-forward filter has five real taps and one complex tap and the feedback filter has two complex taps, such as illustrated in FIG. 6. The third column is for a typical equalizer in which the feed-forward filter has five complex tap and the feedback filter has two complex taps.

As illustrated in Table 2, a simplified equalizer with a single complex tap achieves improved performance over an example that includes only real taps in the feed-forward filter. While the performance is not as good as a typical equalizer with all complex taps in the feed-forward filter the performance is adequate for a system with a target bit error rate that is less than 1e-12, for example.

TABLE 2

Performance results summary

| | signal to interference ratio (SIR) [dB] | | |
|---|---|---|---|
| Equalizer | LMS Real FF only | LMS-DFE 5-Real, 1 complex FF, 2-complex FB | LMS-DFE 5 complex FF, 2 complex FB |
| Symmetric | 23.5 | 36.1 | 65.7 |
| Rosenberger | 21.1 | 25.3 | 35.8 |
| Parabolic 7 ps/5 ps | 24.1 | 33 | 55.8 |

Table 3 summarizes the simulated SIR performance for simplified equalizer configurations operating on a 100 GHz signal in which the feedback filter includes just one complex tap and the FFE includes three, five, or seven real taps and one complex tap.

TABLE 3

Performance results summary: real
FF with 1 complex tap, 1 complex FB

| FF taps | signal to interference ratio (SIR) [dB] | | |
|---|---|---|---|
|  | 3 | 5 | 7 |
| Symmetric | 35.7 | 35.8 | 35.6 |
| Rosenberger | 22.3 | 23.4 | 24 |
| Parabolic 7 ps/5 ps | 27.1 | 27.7 | 28.4 |

Table 4 summarizes the simulated SIR performance for simplified equalizer configurations operating on a 100 GHz signal in which the feedback filter includes just one complex tap and the FFE includes three, five, or seven real taps and one complex tap.

TABLE 4

Performance results summary: real
FF with 1 complex tap, 2 complex FB

| FF taps | signal to interference ratio (SIR) [dB] | | |
|---|---|---|---|
|  | 3 | 5 | 7 |
| Symmetric | 35.9 | 36.1 | 37.3 |
| Rosenberger | 24.8 | 25.3 | 25.7 |
| Parabolic 7 ps/5 ps | 29.7 | 33 | 34.1 |

Table 5 summarizes the simulated SIR performance for simplified equalizer configurations operating on a 100 GHz signal in which the feedback filter includes just one complex tap and the FFE includes three, five, or seven real taps and one complex tap.

TABLE 5

Performance results summary: real
FF with 1 complex tap, 3 complex FB

| FF taps | signal to interference ratio (SIR) [dB] | | |
|---|---|---|---|
|  | 3 | 5 | 7 |
| Symmetric | 35.8 | 37.1 | 36.1 |
| Rosenberger | 24.7 | 25.3 | 28.9 |
| Parabolic 7 ps/5 ps | 29. | 33.8 | 36.5 |

As can be seen from Tables 3-5, increasing the number of FF taps and the number of FB taps is beneficial. Seven real FF taps with a single complex tap and three complex FB taps achieves acceptable performance for all cases. In these examples, it was determined the best FF decision tap is the first tap after the middle tap.

Figure 12:
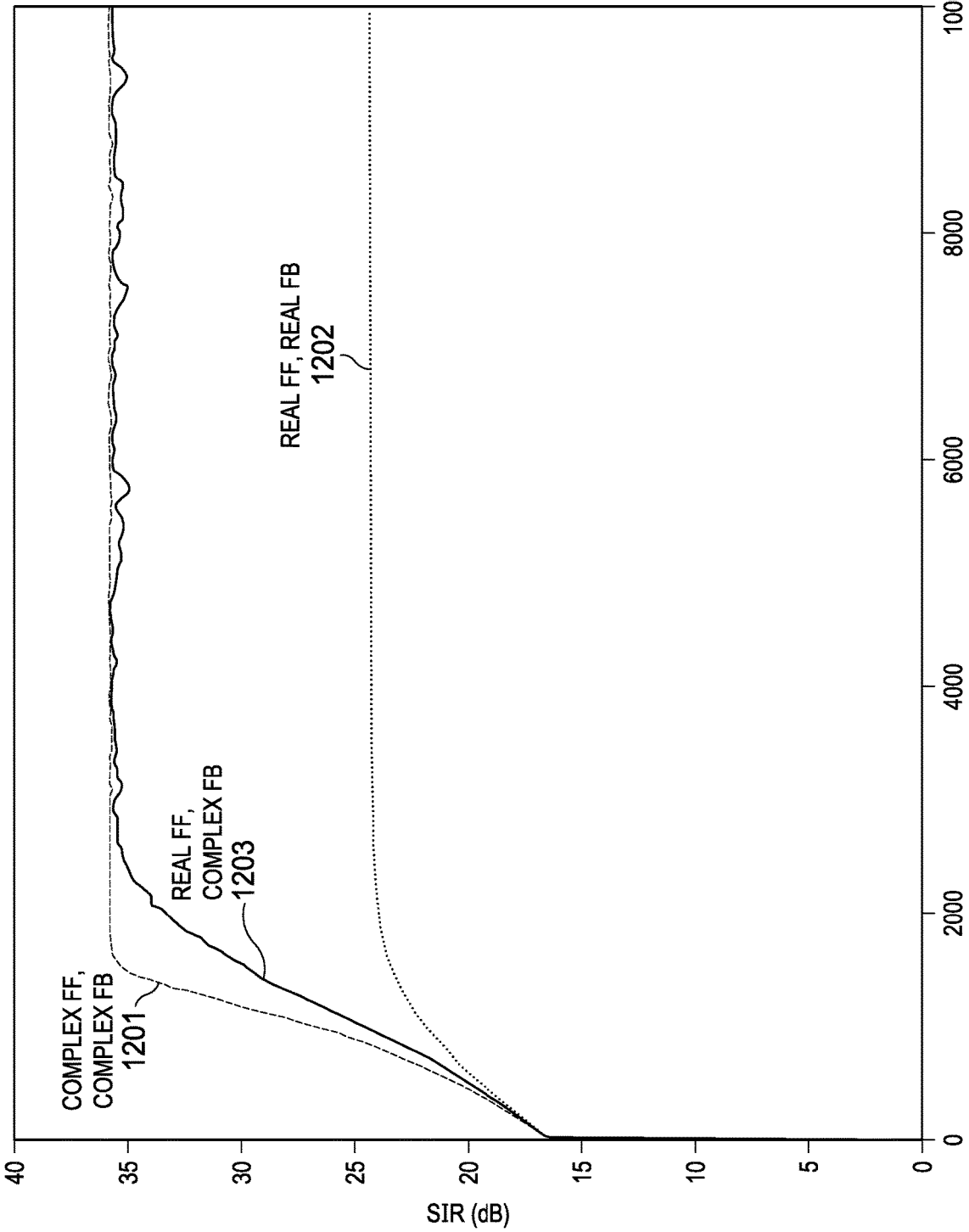
FIGS. 12 and 13 are plots illustrating equalizer performance across a range of symbol rates.

FIG. 12 is a plot illustrating the SIR vs PAM symbol rate performance of various example equalizers as described herein across a range of pulse amplitude modulated (PAM) symbol rates from 0 to 10 k PAM symbols for a symmetric parabolic equalizer. In this example, each of the equalizers has three feedforward filter (FF) taps and one feedback filter (FB) tap. LMS-DFE adaptation is performed on each equalizer. The equalizers operate in decision-directed mode, with an adaptation coefficient $\mu=0.001$.

Plot line 1201 illustrates the performance of a typical complex equalizer in which all three FF taps are complex and the FB tap is complex.

Plot line 1202 illustrates the performance of a basic equalizer in which all the FF taps are real only and in which the FB tap is real only. Note the SIR performance is significantly reduced.

Plot line 1203 illustrates the performance of an example real FF taps while FB tap is complex. Notice that the SIR performance in the steady state is approximately equal to the performance of the typical complex equalizer illustrated by plot line 1201. Thus, good performance is provided by a much simpler equalizer design.

Figure 13:
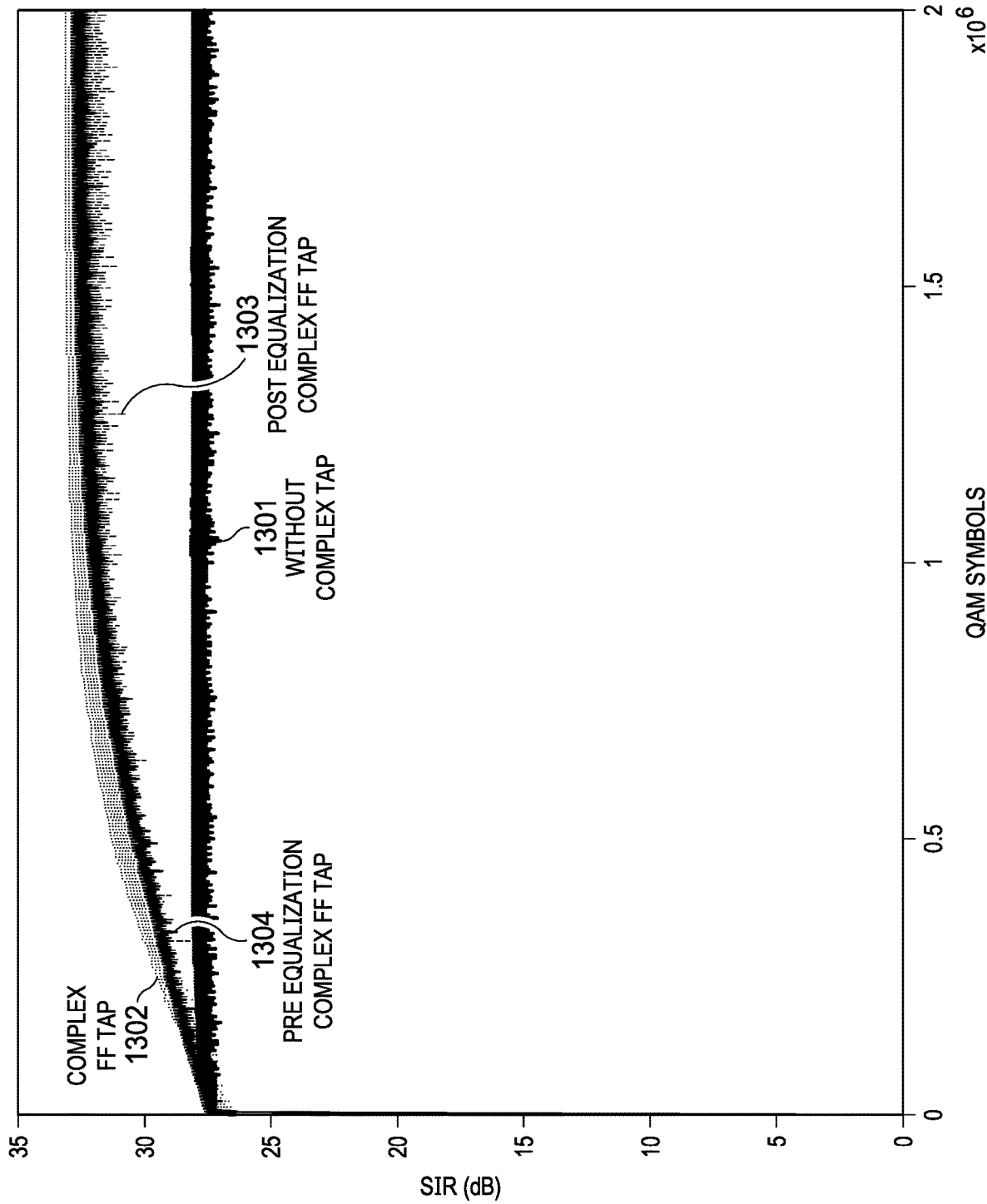

FIG. 13 illustrates the SIR vs QAM symbol rate performance of an example simple equalizer as described herein above with reference to FIGS. 6-11. In this example, there are five feed-forward taps and two feedback taps. The equalizer is configured as a parabolic 7 ps/5 ps equalizer. In this example, only one of the FF taps is complex and the other four FF taps are real only. In this example, the two FB taps are complex. Plot line 1301 illustrates performance of a basic equalizer in which all of the FF taps are real only and in which the FB tap is real only. This configuration results in fixed rotation with channel peak phase. Plot line 1302 illustrates performance of equalizer 600 (FIG. 6) that has a single complex tap in the FFE section. Plot line 1303 illustrates performance of equalizer 700 (FIG. 7) that has a single post-equalization complex tap. Plot line 1304 illustrates performance of equalizer 800 (FIG. 8) that has a single pre-equalization complex tap. Notice the considerable SIR performance gain achieved by adding the complex tap to the real FFE, such as described herein above with reference to FIGS. 6-11.

Figure 14:
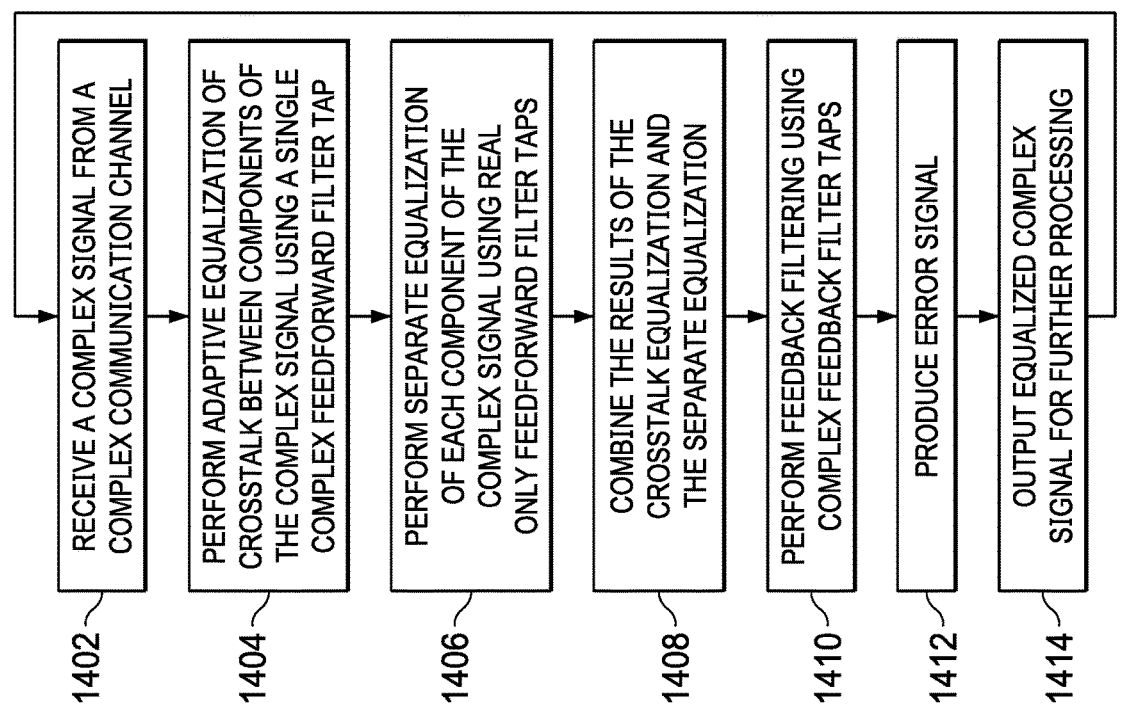

FIG. 14 is a flow chart illustrating operation of a simple adaptive equalizer for a complex channel. For this example, the simple adaptive equalizer may be similar to a simple adaptive equalizer 600 (FIG. 6), or 800 (FIG. 8) described hereinabove in more detail.

At 1402, a complex signal is received from a complex communication channel. In various examples, the complex signal includes an in-phase component and a quadrature phase component, such as generated by a QAM transmitter. In other examples, the complex signal may be generated by a QPSK transmitter. In other examples, other known or later developed techniques may be used to produce a complex communication signal. In this example, the complex communication signal is propagated through a DWG that has a multipath channel effect. Therefore, if information is modulated in magnitude and phase of a transmitted passband sinusoidal signal, the DWG will affect magnitude and phase. Equivalently, in a base-band equivalent model, in-phase and quadrature-phase components of an information signal will be impacted.

At 1404, a single complex feedforward filter tap performs adaptive crosstalk equalization of crosstalk between a first signal component and a second signal component of the complex signal, as described in more detail hereinabove, such as described for complex tap 940 in FIG. 9 or complex tap 1140 in FIG. 11

At 1406, separate adaptive equalization of the first signal component and separate adaptive equalization of the second signal component is performed using real only feedforward filter taps, as described in more detail hereinabove, such as described for stage FFE 910, 911 in FIG. 9 or FFE 1110, 1111 in FIG. 11.

At 1408, the results of the separate adaptive equalization and the crosstalk equalization is combined. In some examples, the results are produced in a comingled manner, such as illustrated by complex tap 940 for FFE 601 in FIG. 9. In other examples, the crosstalk equalization is performed after the separate adaptive equalization is completed, such as illustrated for complex tap 1140 in FIG. 11.

At 1410, feedback filtering of an output signal is performed using a complex feedback filter, such as FB filter 904, 914 of FIG. 9 or FB filter 1104, 1114 of FIG. 11.

At 1412, an error signal is produced by combining the output of the feedback filter with the combined results of the crosstalk equalization and the separate adaptive equalization.

At 1414, an equalized complex signal sample is output for further processing in an associated signal processing system that is coupled to receive the output signal. As each sample or portion of the output signal is output, the process repeats in a continuous manner at 1402.

Figure 15:
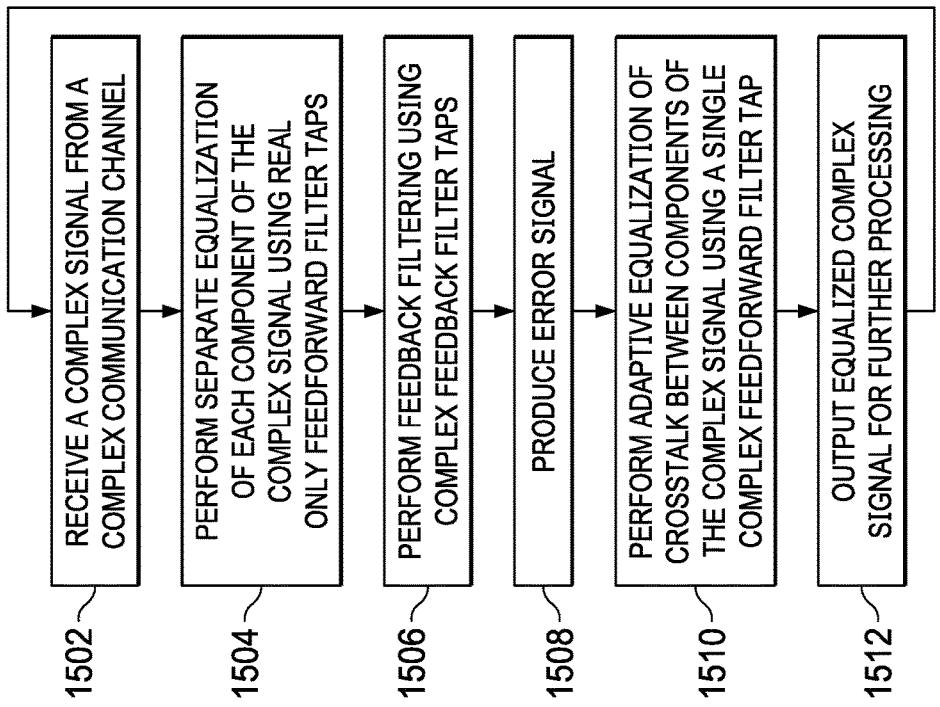
FIGS. 14 and 15 are flow charts illustrating operation of a simple adaptive equalizer for a complex channel.

FIG. 15 is a flow chart illustrating operation of another simple adaptive equalizer for a complex channel. In this example, the simple adaptive equalizer may be similar to simple adaptive equalizer 700 (FIG. 7) described hereinabove in more detail.

At 1502, a complex signal is received from a complex communication channel. In various examples, the complex signal includes an in-phase component and a quadrature phase component, such as generated by a QAM transmitter. In other examples, the complex signal may be generated by a QPSK transmitter. In other examples, other known or later developed techniques may be used to produce a complex communication signal. In this example, the complex communication signal is propagated through a DWG has a multipath channel effect. Therefore, if information is modulated in magnitude and phase of a transmitted passband sinusoidal signal, the DWG will affect magnitude and phase. Equivalently, in a base-band equivalent model, in-phase and quadrature-phase components of an information signal will be impacted.

At 1504, separate adaptive equalization of the first signal component and separate adaptive equalization of the second signal component is performed using real only feedforward filter taps, as described in more detail hereinabove, such as described for stage FFE 1010, 1011 in FIG. 10.

At 1506, feedback filtering of an output signal is performed using a complex feedback filter, such as FB filter 1004, 1014 of FIG. 10.

At 1508, an error signal is produced by combining the output of the feedback filter with the results of the separate adaptive equalization.

At 1510, a single complex feedforward filter tap performs adaptive crosstalk equalization of crosstalk between the equalized first signal component and the equalized second signal component of the complex signal, as described in more detail hereinabove, such as described for complex tap 1040 in FIG. 10.

At 1512, an equalized complex signal sample is output for further processing in an associated signal processing system that is coupled to receive the output signal. As each sample or portion of the output signal is output, the process repeats in a continuous manner at 1502.

In this manner, for a DWG complex channel (or any complex channel), using a low complexity adaptive equalizer structure as described herein provides several advantages. The simple filter structure has flexibility in the design choice LMS adaptation for the real only and single complex taps. The position of single complex feedforward tap can be varied.

The feedback filter can be designed as a single tap complex feedback filter or a multi-complex tap feedback filter depending on system accuracy and cost considerations.

OTHER EMBODIMENTS

In described examples, the received complex signal is a QPSK type complex signal. In other examples, various types of complex signals that have quadrature or other amounts of phase shift may be accommodated by appropriate selection of taps and tap coefficients.

In described examples, the feedback filter is a single tap complex filter. In another example the feedback filter may be designed as a complex multi-tap filter.

In described examples, a complex signal with in-phase and quadrature-phase components is described, such that there is a 90-degree phase relationship. In another example, there may a different phase relationship, such as a 120-degree relationship, a 45-degree relationship, etc.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. An adaptive equalizer comprising:
a feedforward equalizer (FFE) having an FFE input and an FFE output, the FFE configured to receive a complex signal at the FFE input, the complex signal having first and second signal components, the FFE including at least one real only tap;
a complex tap coupled to the FFE output, the complex tap configured to perform adaptive equalization of crosstalk between the first signal component and the second signal component;
a summer having a first input, a second input, and a summer output, the first input coupled to the FFE output;
a decision circuit having a respective input and a respective output, its input coupled to the summer output, the decision circuit configured to provide a symbol at its output responsive to an equalized signal at its input; and
a complex feedback (FB) filter having a FB input and a FB output, the FB input coupled to the output of the decision circuit, the FB output coupled to the second input of the summer.

2. The adaptive equalizer of claim 1, wherein the complex tap is included within the FFE.

3. The adaptive equalizer of claim 1, wherein the complex tap is coupled between the FFE output and the first input of the summer.

4. The adaptive equalizer of claim 3, wherein the FFE includes only real taps.

5. The adaptive equalizer of claim 1, further comprising a multiplier having respective first and second inputs and a multiplier output, its first input coupled to the FFE output, its second input coupled to complex tap, and the multiplier output coupled to the first input of the summer.

6. The adaptive equalizer of claim 1, wherein the complex tap is coupled between the summer output and the input of the decision circuit.

7. The adaptive equalizer of claim 6, wherein the FFE includes only real taps.

8. The adaptive equalizer of claim 1, further comprising a multiplier having respective first and second inputs and a multiplier output, its first input coupled to the summer output, its second input coupled to the complex tap, and the multiplier output coupled to the input of the decision circuit.

9. The adaptive equalizer of claim 1, wherein the FFE input includes first and second input terminals, the FFE configured to receive the first signal component at its first input terminal, and the FFE configured to receive the second signal component at its second input terminal.

10. The adaptive equalizer of claim 1, wherein the complex feedback filter includes two complex taps.

11. The adaptive equalizer of claim 1, further comprising least mean squared (LMS) adaption logic coupled to the decision circuit, the LMS adaption logic configured to adapt a filter coefficient of the at least one real only tap of the FFE and a filter coefficient of the complex tap.

12. A method for filtering a complex signal, the method comprising:
receiving a complex signal having a first signal component and a second signal component;
performing separate adaptive equalization of the first signal component and the second signal component to form a respective first equalized signal component and a second equalized signal component using at least one real only tap of a feedforward equalizer;
performing adaptive equalization of crosstalk between the first signal component and the second signal component to form an equalized crosstalk signal using a complex tap;
generating an error signal from the equalized first and second signal components using a complex feedback filter; and
combining the error signal with the first and second equalized signal components and the crosstalk signal to generate an equalized complex signal.

13. The method of claim 12, wherein combining the error signal includes combining the error signal with the first and second equalized signal components while performing the separate adaptation equalization of the first signal component and the second signal component.

14. The method of claim 12, further comprising combining the equalized crosstalk signal with the first equalized signal component and the second equalized signal component prior to combining the error signal with the first and second equalized signal components.

15. The method of claim 12, further comprising combining the equalized crosstalk signal with the first equalized signal component and the second equalized signal component after combining the error signal with the first and second equalized signal components.

16. The method of claim 12, further comprising adaptively adjusting tap coefficients of the at least one real tap and the complex tap using a least means squared logic.

17. A system comprising:
a transmitter having an output, the transmitter configured to provide at its output a complex signal having a first signal component and a second signal component;
a dielectric waveguide having a respective input and a respective output, its input coupled to the output of the transmitter;
a receiver having a respective input and configured to receive the complex signal at its input, the receiver including an adaptive equalizer having an output and including:
a feedforward equalizer (FFE) having an FFE input and an FFE output, the FFE input coupled to the input of the receiver, the FFE having at least one real only tap;
a complex tap coupled to the FFE output, the complex tap configured to perform adaptive equalization of crosstalk between the first signal component and the second signal component of the complex signal; and
a feedback (FB) filter having a FB input and a FB output, the FB input coupled to the output of the adaptive equalizer, the FB output coupled to the FFE output.

18. The system of claim 17, wherein the complex tap is included within the FFE.

19. The system of claim 17, wherein the complex tap is coupled between the FFE output and the FB output.

20. The system of claim 17, wherein the complex tap is coupled between the FB output and the output of the adaptive equalizer.

* * * * *